(12) United States Patent
Ward (10) Patent No.: US 11,453,069 B2
(45) Date of Patent: Sep. 27, 2022

(54) DRILLING TOOL ASSEMBLY INCLUDING A STEP DRILL BIT

(71) Applicant: MILWAUKEE ELECTRIC TOOL CORPORATION, Brookfield, WI (US)

(72) Inventor: Bryan C. Ward, Wauwatosa, WI (US)

(73) Assignee: MILWAUKEE ELECTRIC TOOL CORPORATION, Brookfield, WI (US)

( * ) Notice: Subject to any disclaimer, the term of this patent is extended or adjusted under 35 U.S.C. 154(b) by 29 days.

(21) Appl. No.: 17/058,322

(22) PCT Filed: Jul. 24, 2019

(86) PCT No.: PCT/US2019/043181
§ 371 (c)(1),
(2) Date: Nov. 24, 2020

(87) PCT Pub. No.: WO2020/023600
PCT Pub. Date: Jan. 30, 2020

(65) Prior Publication Data
US 2021/0197295 A1   Jul. 1, 2021

Related U.S. Application Data

(60) Provisional application No. 62/702,469, filed on Jul. 24, 2018.

(51) Int. Cl.
*B23B 51/00* (2006.01)

(52) U.S. Cl.
CPC ........ *B23B 51/009* (2013.01); *B23B 2251/02* (2013.01); *B23B 2251/606* (2013.01); *B23B 2260/022* (2013.01)

(58) Field of Classification Search
CPC .............. B23B 51/009; B23B 2251/02; B23B 2251/606; B23B 2260/022;
(Continued)

(56) References Cited

U.S. PATENT DOCUMENTS

| 4,750,750 A | 6/1988 | Batalorf, Jr. |
| 8,388,280 B1 | 3/2013 | Ison et al. |

(Continued)

FOREIGN PATENT DOCUMENTS

| DE | 102013206573 A1 | 10/2014 | |
| EP | 811449 A2 * | 12/1997 | ........... B23B 51/009 |

(Continued)

OTHER PUBLICATIONS

International Search Report and Written Opinion for Application No. PCT/US2019/043181 dated Nov. 13, 2019 (12 pages).

*Primary Examiner* — Eric A. Gates
*Assistant Examiner* — Paul M Janeski
(74) *Attorney, Agent, or Firm* — Michael Best & Friedrich LLP (57) ABSTRACT

A drilling tool includes a step drill bit and an arbor assembly. The arbor assembly includes a shank having a first end, a second end opposite the first end, and a longitudinal axis extending through the first and second ends. The first end of the shank is removably coupled to the step drill bit, and the second end of the shank is configured to be coupled to a power tool. The arbor assembly includes a sleeve moveable along the shank parallel to the longitudinal axis, and a ball bearing disposed on the sleeve and moveable with the sleeve. The ball bearing engages the step drill bit to releasably secure the step drill bit to the shank. When the sleeve moves toward the second end of the shank, the ball bearing moves radially inward and disengages the step drill bit, allowing removal of the step drill bit from the shank.

20 Claims, 5 Drawing Sheets

(58) Field of Classification Search
CPC ............ B23B 51/0426; B23B 51/0081; B23B 51/0473; B23B 2231/0204; B23B 51/0411; B23B 51/08; B23B 31/1071
See application file for complete search history.

(56) References Cited

U.S. PATENT DOCUMENTS

| | | | |
|---|---|---|---|
| 2012/0207557 A1* | 8/2012 | Durfee | B23B 51/009 |
| | | | 408/223 |
| 2014/0023445 A1* | 1/2014 | Allen | B23B 51/009 |
| | | | 408/224 |
| 2017/0341161 A1* | 11/2017 | Boske | B23B 51/0473 |

FOREIGN PATENT DOCUMENTS

| | | |
|---|---|---|
| JP | 2007203396 A | 8/2007 |
| WO | 2012106243 A2 | 8/2012 |

* cited by examiner

DRILLING TOOL ASSEMBLY INCLUDING A STEP DRILL BIT

CROSS REFERENCE TO RELATED APPLICATIONS

This application is a national phase filing under 35 U.S.C. 371 of International Application No. PCT/US2019/043181, filed Jul. 24, 2019, which claims priority to U.S. Provisional Patent Application No. 62/702,469, filed Jul. 24, 2018, the entire contents of which are incorporated herein by reference.

BACKGROUND

The present invention relates to power tool accessories. More specifically, the present invention relates to step drill bits.

Step drill bits are used in a variety of applications and industries where a user may need to drill holes through a thin-walled work piece. A step drill bit allows a user to drill holes in a progressive range of sizes with a single bit. Step drill bits can be coupled to a power tool such as a drill or an impact driver.

SUMMARY

In one embodiment, the invention provides a drilling tool including a step drill bit and an arbor assembly. The arbor assembly includes a shank having a first end, a second end opposite the first end, and a longitudinal axis extending through the first and second ends. The first end of the shank is removably coupled to the step drill bit, and the second end of the shank is configured to be coupled to a power tool. The arbor assembly also includes a sleeve moveable along the shank in a direction parallel to the longitudinal axis, and a ball bearing disposed on the sleeve and moveable with the sleeve. The ball bearing engages the step drill bit to releasably secure the step drill bit to the shank. When the sleeve moves toward the second end of the shank, the ball bearing moves radially inward and disengages the step drill bit, allowing removal of the step drill bit from the shank.

In another embodiment, the invention provides a drilling tool assembly including an arbor assembly having a shank with a first end, a second end opposite the first end that is configured to be coupled to a power tool, and a longitudinal axis extending through the first and second ends. The drilling tool assembly also includes a step drill bit that is removably coupled to the arbor assembly. The step drill bit includes a body having a proximate end adjacent the arbor assembly, a distal end opposite the proximate end, and a plurality of axially spaced progressively sized steps between the proximate end and the distal end. The body further includes a bore centrally located on the step drill bit. The drilling assembly further includes a pilot bit that is removably coupled to the arbor assembly and extends through the central bore of the step drill bit. The pilot bit includes a first end that is coupled to the arbor assembly and a second end extending past the distal end of the step drill bit to define a cutting tip.

In another embodiment, the invention provides a drilling tool assembly including an arbor assembly having a shank with a first end, a second end opposite the first end that is configured to be coupled to a power tool, and a longitudinal axis extending through the first and second ends. The arbor assembly is made of a first material. The drilling tool assembly also includes a step drill bit coupled to the arbor assembly. The step drill bit includes a body having a proximate end adjacent the arbor assembly, a distal end opposite the proximate end, and a plurality of axially spaced progressively sized steps between the proximate end and the distal end. The step drill bit is made of a second material that is different than the first material. The drilling tool assembly further includes a pilot bit coupled to the arbor assembly and extending through the step drill bit. The pilot bit is made of a third material that is different than the first material.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
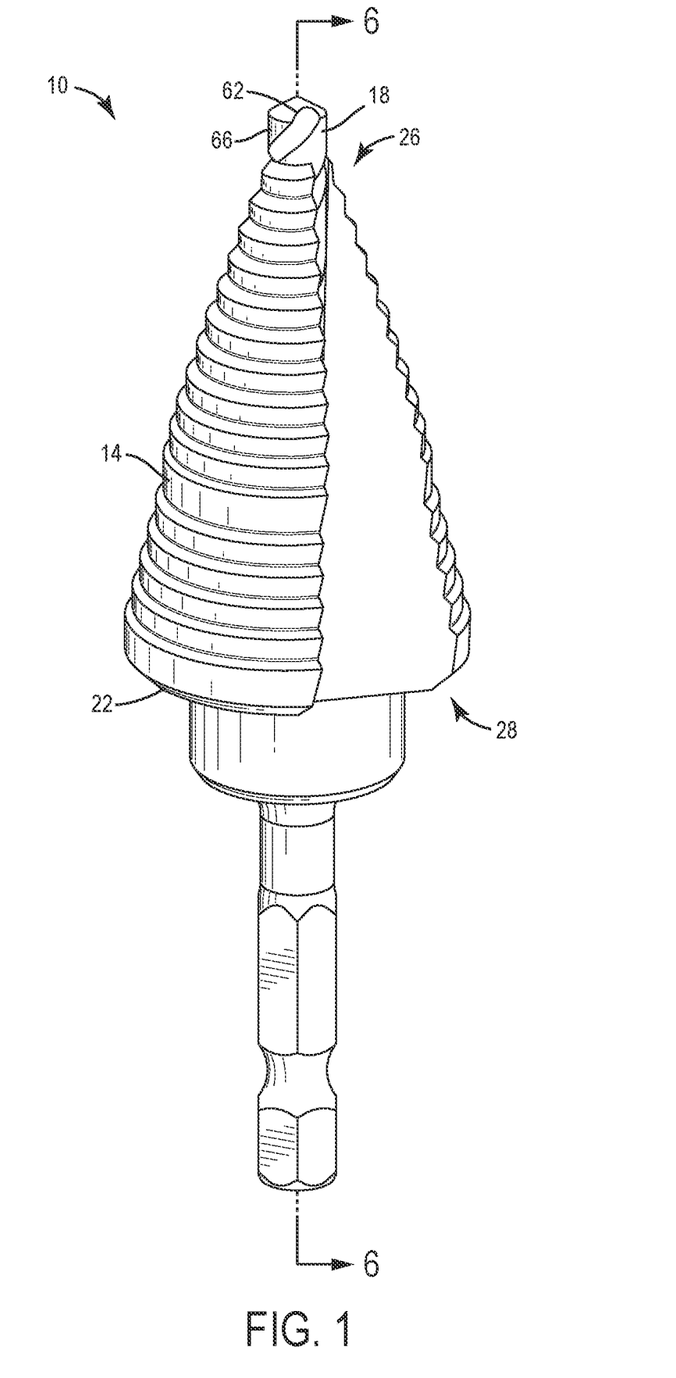
FIG. 1 is a perspective view of a drilling tool.

FIG. 1 illustrates a drilling tool 10 including a step drill bit 14, a pilot bit 18, and an arbor assembly 22 for a step drill bit 14. The arbor assembly 22 includes a release mechanism for releasably coupling both the step drill bit 14 and the pilot bit 18 to the arbor assembly 22. Thus, the arbor assembly 22 allows different types and/or sizes of step drill bits and pilot bits to be interchangeably coupled to the arbor assembly 22 without the use of tools. Furthermore, if one part should fail first (e.g., the arbor assembly 22, the pilot bit 18, or the step drill bit 14), a user can remove and replace that part instead of needing to throw away the entire drilling tool 10.

Figure 2:
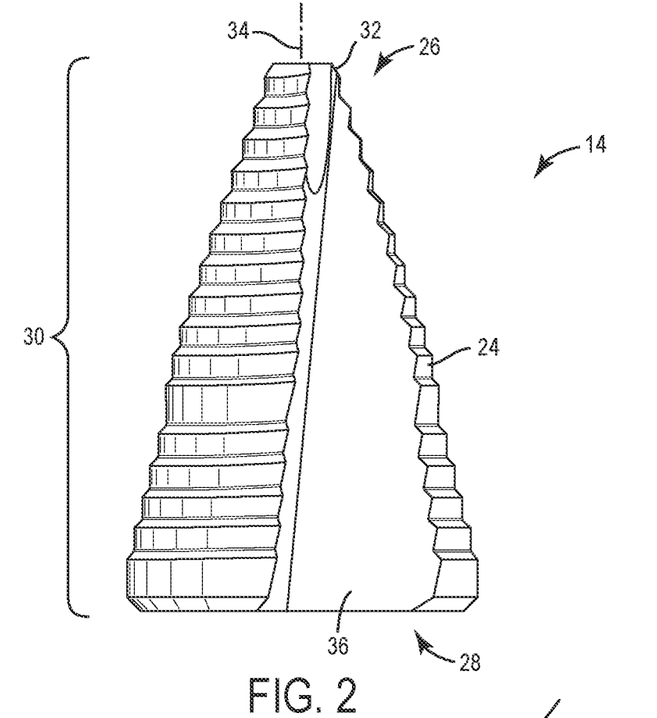
FIG. 2 is an elevational view of a step drill bit of the drilling tool of FIG. 1.

With reference to FIG. 2, the step drill bit 14 includes a body 24 with a distal end 26 and a proximate end 28 opposite the distal end 26. The body 24 defines a plurality of axially stacked, progressively sized steps 30 between a terminal step 32 adjacent the distal end 26 and the proximate end 28. The steps 30 are axially stacked in that the steps 30 are coaxially arranged along a bit axis 34. In addition, the steps 30 are progressively sized in that the steps 30 incrementally increase in size (e.g., diameter) from the distal end 26 to the proximate end 28. In the illustrated embodiment, the step drill bit 14 includes sixteen axially stacked steps 30. In other embodiments, the step drill bit 14 may include fewer or more steps 30, and/or each step 30 may have a different diameter. The step drill bit 14 further includes a flute or groove 36 that defines a cutting edge of the step drill bit 14. In the illustrated embodiment, the step drill bit 14 includes two flutes 36. In other embodiments, the step drill bit 14 may include a single flute 36 or more than two flutes 36.

Figure 3:
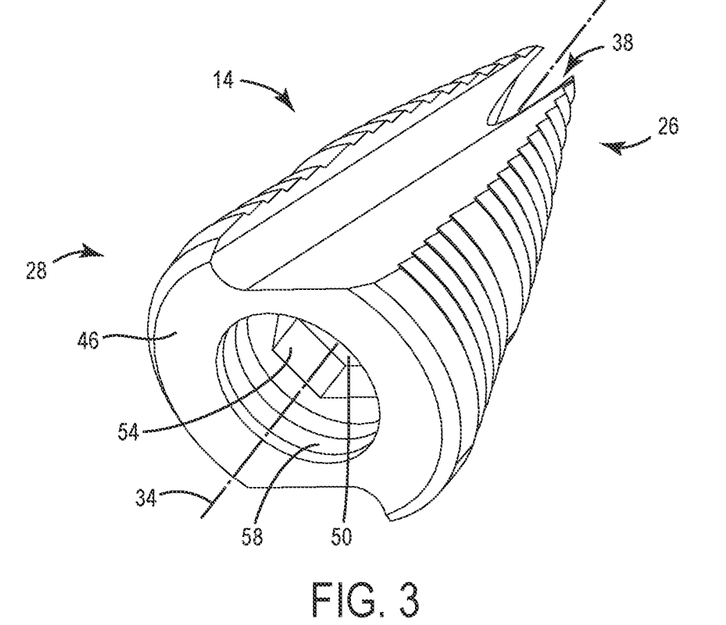
FIG. 3 is a perspective view of the step drill bit of FIG. 2.

With reference to FIG. 3, the step drill bit 14 includes a bore 38 that extends centrally along the bit axis 34 from the distal end 26 to the proximate end 28. The pilot bit 18 is positioned in the bore 38 and extends outward from the bore 38 at the distal end 26 when the drilling tool 10 is assembled. The step drill bit 14 further includes a bottom 46 adjacent the proximate end 28. The bottom 46 defines an opening 50 that receives a portion of the arbor assembly 22 to couple the step drill bit 14 to the arbor assembly 22. In the illustrated embodiment, the opening 50 includes a hex-shaped section 54. The hex-shaped section 54 allows the step drill bit 14 to slide linearly on to and off of the arbor assembly 22 without rotating the step drill bit 14. The opening 50 also includes a channel 58 adjacent the hex-shaped section 54. The channel 58 selectively receives part of the arbor assembly 22 to releasably secure the step drill bit 14 to the arbor assembly 22. In the illustrated embodiment, the channel 58 is defined by a continuous annular groove formed on an inner surface of the step drill bit 14.

Figure 6:
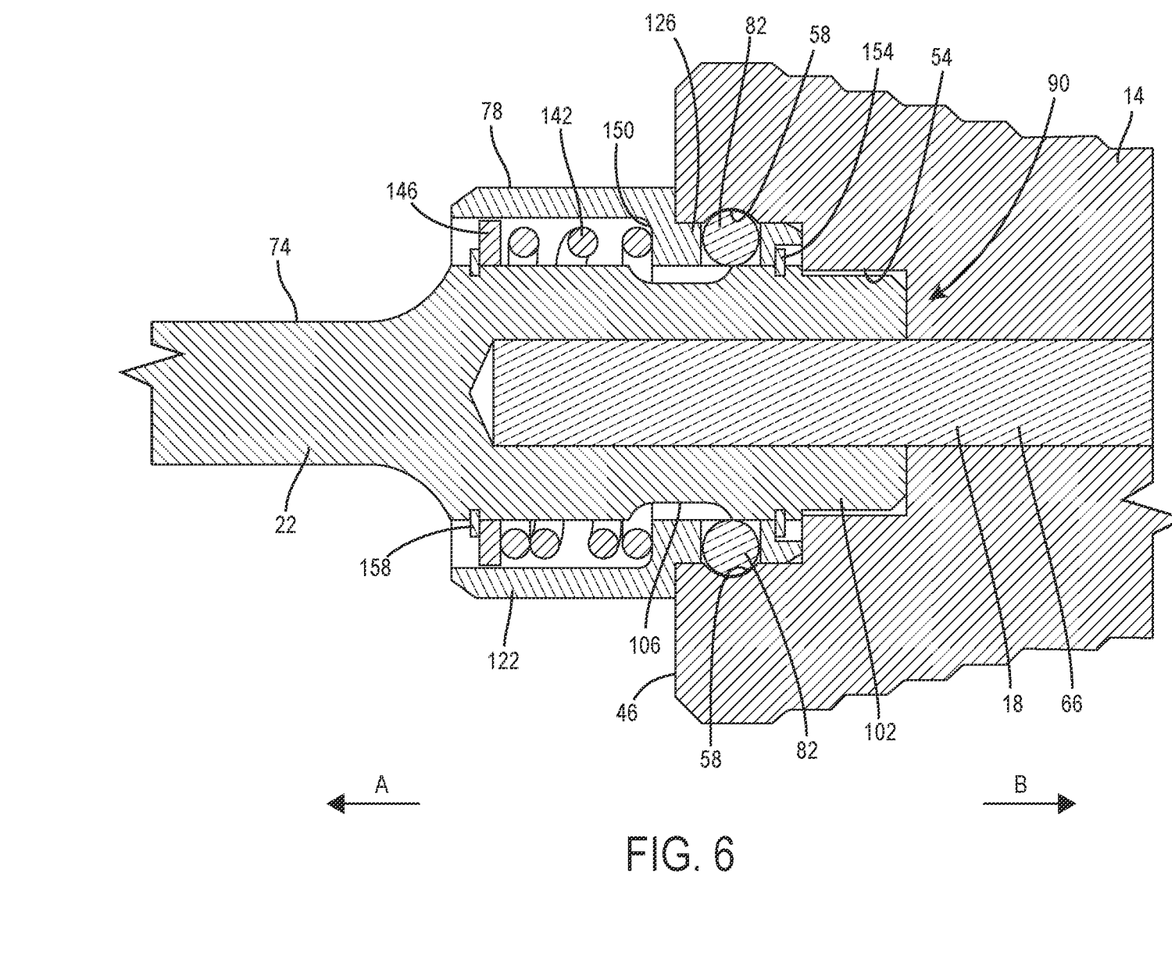
FIG. 6 is a cross-sectional view of the drilling tool of FIG. 1 taken along lines 6-6.

Referring to FIGS. 1 and 6, the pilot bit 18 is coupled to the arbor assembly 22 and surrounded by the step drill bit 14. The pilot bit 18 includes a cutting portion 62 (FIG. 1) and a shaft 66. The cutting portion 62 extends beyond the distal end 26 of the step drill bit 14 and forms a tip for the drilling tool 10. The cutting portion 62 or tip of the pilot bit 18 replaces a tip of the step drill bit 14 as the cutting tip for the drilling tool 10. The illustrated shaft 66 is generally hex-shaped. In other embodiments, the shaft 66 may have other configurations (e.g., a flattened section or D-shape). The shaft 66 is received by the arbor assembly 22. In the illustrated embodiment, the pilot bit 18 is a twist drill bit. The step drill bit 14 and the pilot bit 18 are both removable from the arbor assembly 22 separately or simultaneously.

Figure 4:
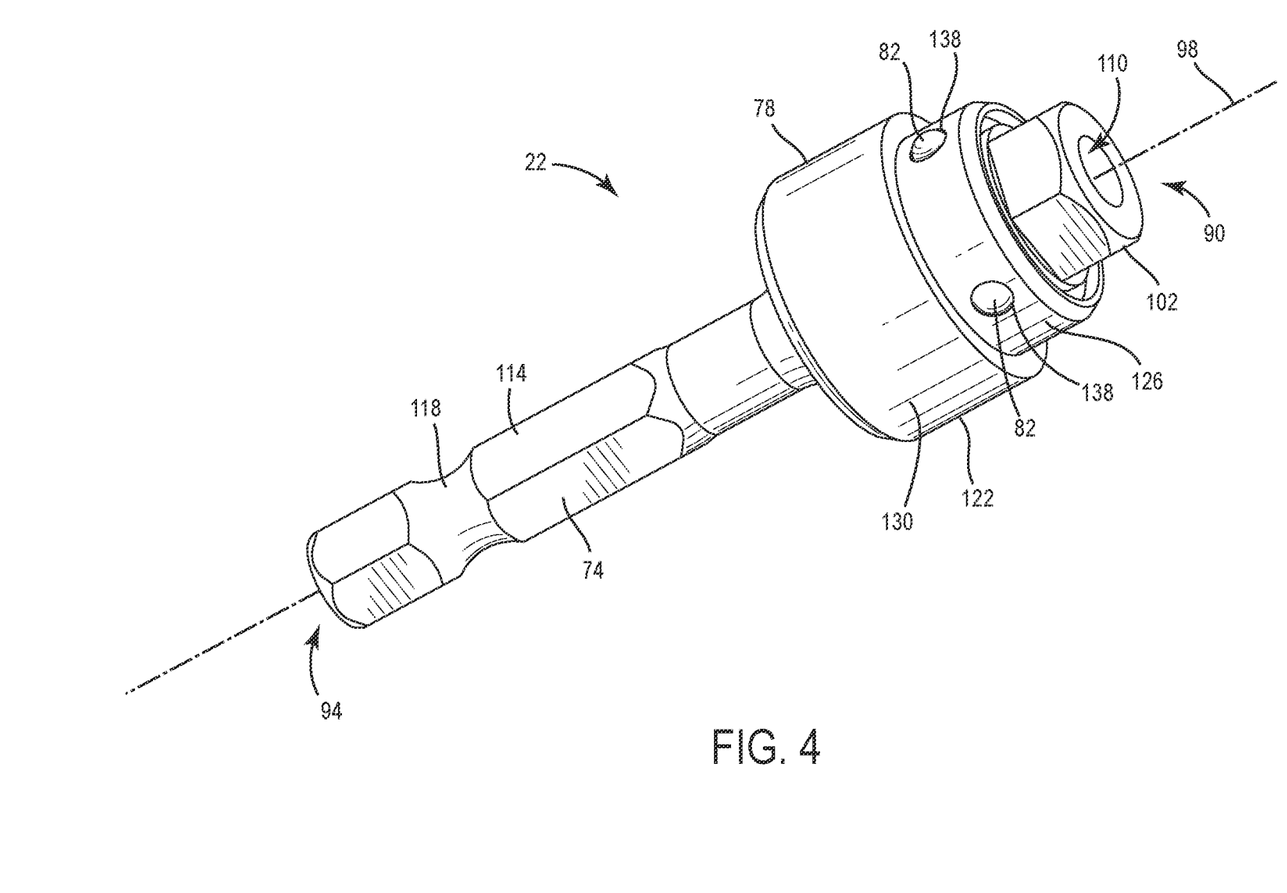
FIG. 4 is a perspective view of an arbor assembly of the drilling tool of FIG. 1.
Figure 5:
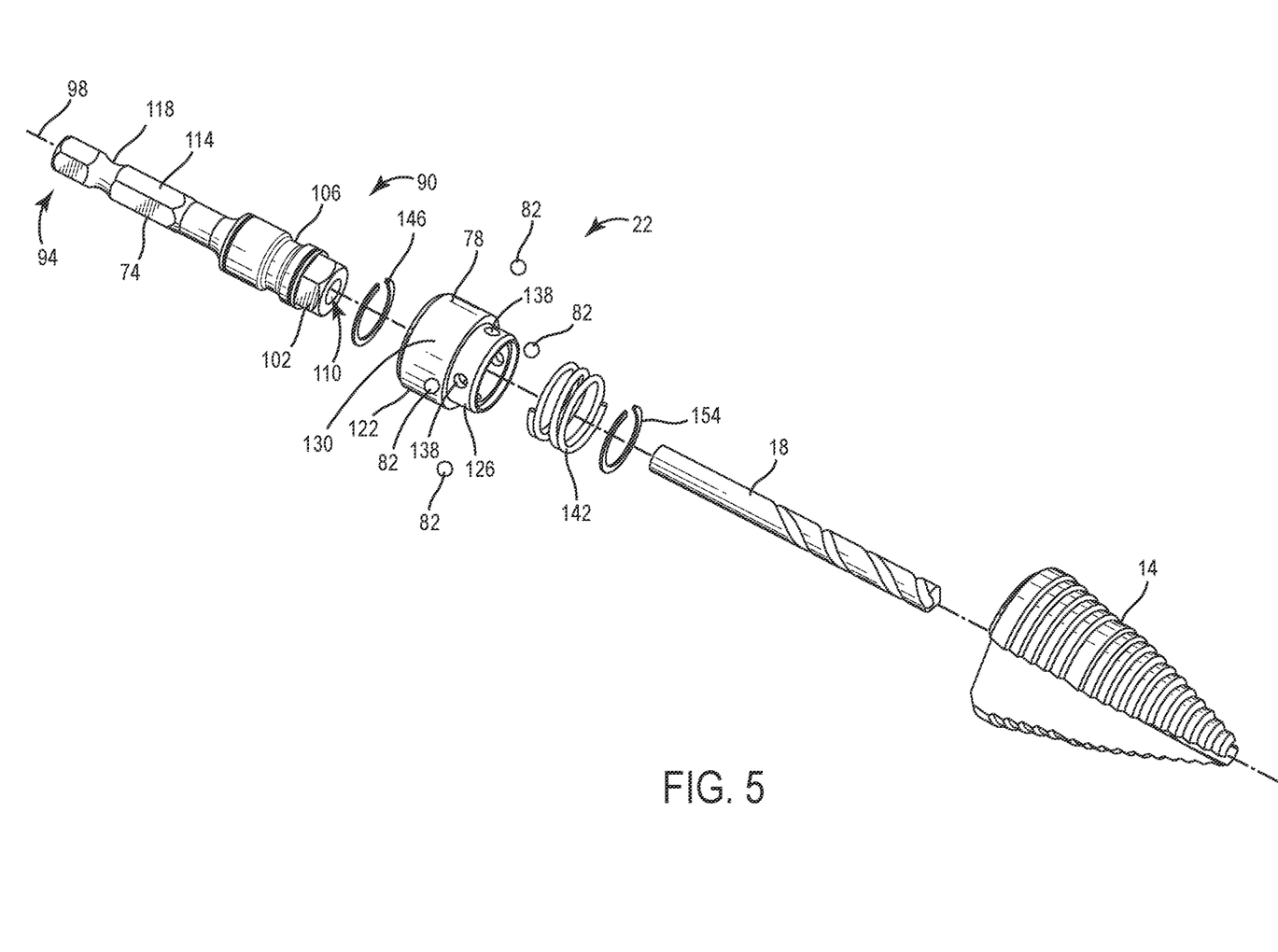
FIG. 5 is an exploded view of the drilling tool of FIG. 1.

As shown in FIGS. 4 and 5, the illustrated arbor assembly 22 includes a shank 74, a sleeve 78, and ball bearings 82. The shank 74 forms the main body of the arbor assembly 22 and includes a first end 90 and a second end 94. The shank 74 also defines a longitudinal axis 98 extending through the first and second ends 90, 94. The first end 90 removably couples to the step drill bit 14 and to the pilot bit 18. In particular, the illustrated first end 90 defines a hex-shaped boss 102, an annular recess 106 (FIG. 5), and an opening 110. The hex-shaped boss 102 is received in the hex-shaped section 54 (FIG. 3) of the bottom 46 to inhibit relative rotation between the step drill bit 14 and the arbor assembly 22. In other words, the hex-shaped boss 102 is received in the hex-shaped section 54 to drive rotation of the step drill bit 14 with the arbor assembly 22. In other embodiments, the arbor assembly 22 and/or the step drill bit 14 may include other suitable structures for drivingly connecting the step drill bit 14 to the arbor assembly 22. For example, the boss 102 may include lobes, pins, or the like to couple the step drill bit 14 to the arbor assembly 22. The annular recess 106 is formed on an outer surface of the shank 74 adjacent the hex-shaped boss 102. The opening 110 is a bore formed through part of the shank 74. In the illustrated embodiment, the opening 110 is a hex-shaped opening that receives the shaft 66 of the pilot bit 18. The second end 94 of the shank 74 is configured to be coupled to the power tool. In the illustrated embodiment, the second end 94 includes a hex-shaped shaft 114 having an annular groove 118 that is configured to be received in and engaged by a chuck of the power tool. In other embodiments, the second end 94 may include other suitable shafts or coupling mechanisms for connecting to a power tool.

The sleeve 78 is supported by the shank 74 and is movable (e.g., slidable) along the shank 74 in a direction parallel to the longitudinal axis 98. In some embodiments, the sleeve 78 may also or alternatively rotate relative to the shank 74. The illustrated sleeve 78 includes a first body 122 and a second body 126. The first body 122 includes an outer grip surface 130 configured to be engaged by a user to move the sleeve 78 relative to the shank 74. The second body 126, or carrier, is coupled to and extends from the first body 122 adjacent the first end 90 of the shank 74. In the illustrated embodiment, the second body 126 is integrally formed as a single piece with the first body 122. In other embodiments, the first body 122 may be coupled to the second body 126 with pins, lobes, or the like. The second body 126 defines apertures 138 that receive the ball bearings 82.

Moving to FIG. 6, the sleeve 78 is biased toward the first end 90 of the shank 74 by a spring 142. The spring 142 is positioned around a portion of the shank 74 within the sleeve 78. The illustrated spring 142 is a coil spring, although other suitable springs may also or alternatively be used. The spring 142 is captured between a stop ring 146 and a ramped ring 150 coupled to an inner surface of the sleeve 78. In addition, movement of the sleeve 78 along the shank 74 is limited by snap rings 154, 158. The first snap ring 154 is coupled to the outer surface of the shank 74 between the hex-shaped boss 102 and the annular recess 106. The sleeve 78 contacts the first snap ring 154 when the sleeve 78 is biased toward the first end 90 of the shank 74 by the spring 142. The second snap ring 158 is coupled to the outer surface of the shank 74 adjacent the hex-shaped shaft 114. The stop ring 146, under the bias of the spring 142, maintains contact with the second snap ring 158.

Referring back to FIGS. 4 and 5, the ball bearings 82 are disposed on the sleeve 78. More particularly, the ball bearings 82 are supported in the apertures 138 of the second body 126. In the illustrated embodiment, the arbor assembly 22 includes four ball bearings circumferentially spaced around the shank 74. In other embodiments, the arbor assembly 22 may include fewer or more ball bearings 82. The ball bearings 82 are movable with the sleeve 78 as the sleeve 78 moves (e.g., slides) along the shank 74. As shown in FIG. 6, the ball bearings 82 extend radially outward from the second body 126 when the sleeve 78 is in a first position to engage the step drill bit 14. More particularly, the ball bearings 82 extend into the channel 58 in the bottom 46 of the step drill bit 14 to releasably secure the step drill bit 14 to the arbor assembly 22. The ball bearings 82 move radially inward when the sleeve 78 is in a second position to disengage the step drill bit 14. More particularly, the ball bearings 82 move into the annular recess 106 of the shank 74 to allow removal of the step drill bit 14 from the arbor assembly 22.

In some embodiments, the ball bearings 82 are first ball bearings, and the arbor assembly 22 further includes second ball bearings. The second ball bearings may engage an annular groove disposed on the shaft 66 of the pilot bit 18 to releasably secure the pilot bit 18 to the arbor assembly 22. In further embodiments, the pilot bit 18 may be integral with the arbor assembly 22, such as, for example, by welding or the like.

In operation of the arbor assembly 22, the sleeve 78 starts in the first position such that the step drill bit 14 and the pilot bit 18 are secured to the arbor assembly 22. In this position, the sleeve 78 is moved (e.g., linearly slid) toward the first end 90 of the shank 74 under the bias of the spring 142. The ball bearings 82, thereby, are moved out of the annular recess 106 of the shank 74 so that the ball bearings 82 extend into and engage the channel 58 of the step drill bit 14. While in this position, the step drill bit 14 and the pilot bit 18 cannot be readily pulled off of the arbor assembly 22.

The sleeve 78 is then moved to the second position such that the step drill bit 14 is removable from the arbor assembly 22 and the pilot bit 18 is secured to the arbor assembly 22. In this position, the sleeve 78 is moved in the direction of arrow A (FIG. 6) toward the second end 94 of the shank 74 against the bias of the spring 142. The ball bearings 82, thereby, are moved into the annular recess 106 of the shank 74 so that the ball bearings 82 disengage the channel 58 of the step drill bit 14. While in this position, the step drill bit 14 can be removed from (e.g., pulled off of) the arbor assembly 22 in the direction of arrow B (FIG. 6), but the pilot bit 18 remains secured to the arbor assembly 22. The hex-shaped section 54 of the step drill bit 14 and hex-shaped boss 102 of the shank 74 allow the step drill bit 14 to be pulled linearly off of the arbor assembly 22 without rotating the step drill bit 14 relative to the arbor assembly 22. In some embodiments, while in the second position, the pilot bit 18 may also be removed from the arbor assembly 22. Alternatively, in further embodiments, the pilot bit 18 may be removed from the arbor assembly 22 when the sleeve 78 is moved to a third position beyond the second position.

Although the illustrated arbor assembly 22 is described as having the spring 142, which biases the sleeve 78 in one direction, in other embodiments, the spring 142 may be omitted. For example, the sleeve 78 may be moved along the shank 74 only in response to actuation from a user. In such embodiments, the shank 74 and/or the sleeve 78 may include detent-type mechanisms to releasably hold the sleeve 78 in one or more of its positions. Additionally, in further embodiments, the sleeve 78 may rotate relative to the shank 74 to change positions. For example, the sleeve 78 may be threadably coupled to the shank 74 such that rotation of the sleeve 78 causes movement along the shank 74. Alternatively, the sleeve 78 may rotate about the shank 74 without changing axial positions, but such rotation may still cause movement of the ball bearings 82 to engage and disengage the step drill bit 14 and the pilot bit 18.

During use, interaction of hex-shaped profiles (e.g., the hex-shaped section 54 and the hex-shaped boss 102, and the hex-shaped opening 110 and the hex-shaped shaft 66) are used to drive rotation of the step drill bit 14 and the pilot bit 18. The ball bearings 82 inhibit relative axial movement between the step drill bit 14 and the arbor assembly 22, but are not rotationally fixed relative to the step drill bit 14, which may increase bearing life. In addition, by having the ball bearings 82 face outwardly to engage the step drill bit 14, the arbor assembly 22 can be smaller than previous arbors that have ball bearings extending inwardly.

In some embodiments, the step drill bit 14 may include an extension extending from the bottom 46 to engage and secure the step drill bit 14 to the arbor assembly 22. For example, in cases where the diameter of the step drill bit 14 is smaller than the boss 102 of the arbor assembly 22 the extension would couple the step drill bit 14 to the arbor assembly 22.

In the illustrated embodiment, the pilot bit 18 may be made of a first material, such as high speed steel. Specifically, the pilot bit 18 may be made of ASTM A600 M35 or M2 that is strong and durable enough to start a bore during operation of the drilling tool 10. The pilot bit 18 preferably has a Rockwell hardness, measured on the C scale, that is in a range between 63-68 HRC. The step drill bit 14 may be made of a second material, such as high speed steel. Specifically, the step drill bit 14 may be made of ASTM A600 M42 steel, that is strong and durable to expand the bore. The step drill bit 14 preferably has a Rockwell Hardness, measured on the C scale, that is in a range between 63-67 HRC. Finally, the arbor assembly 22 can be made of a third material, such as silicon vanadium chrome magnesium (SVCM) steel, which is capable to absorb shock loads experienced during operation of the drilling tool 10. Preferably, the arbor assembly 22 has a Rockwell hardness, measured on the C scale, that is in a range between 52-56 HRC. The arbor assembly 22 preferably has a hardness that is lower than the pilot bit 18 to increase its ductility. In some embodiments, the first, second, and third materials are the same material. In other embodiments, the first, second, and third materials are all different materials. In further embodiments, two of the first, second, and third materials are the same material, while the other material is different. In some embodiments, the pilot bit 18 may be coated with cobalt or a PVD (physical vapor deposition) coating, such as titanium-nitride. The coating may help reduce burn out. In other embodiments, a coating may be applied to both the pilot bit 18 and the step drill bit 14. In further embodiments, the arbor assembly may include a coating such as black oxide or the like.

Providing a drilling tool 10 with an arbor assembly 22 that selectively couples a pilot bit 18 and a step drill bit 14 allows for the replacement of parts that may have become damaged during operation of the drilling tool 10. For example, the pilot bit 18, which provides the cutting tip and typically has some of the greatest wear, can be easily replaced with a new pilot bit without needing to purchase an entire drilling tool 10. Alternatively, the step drill bit 14 or the arbor assembly 22 can be replaced without the need to purchase an entirely new drilling tool 10.

Various features and advantages of the invention are set forth in the following claims.

What is claimed is:
1. A drilling tool comprising:
   a step drill bit; and
   an arbor assembly including
      a shank having a first end, a second end opposite the first end, and a longitudinal axis extending through the first and second ends, the first end of the shank is removably coupled to the step drill bit, and the second end of the shank is configured to be coupled to a power tool,
      a sleeve disposed around the shank and moveable along the shank in a direction parallel to the longitudinal axis,
      a ball bearing disposed on the sleeve and moveable with the sleeve, the ball bearing engaging the step drill bit to releasably secure the step drill bit to the shank;
   wherein when the sleeve moves toward the second end of the shank, the ball bearing moves radially inward and disengages the step drill bit, allowing removal of the step drill bit from the shank.

2. The drilling tool of claim 1, further comprising a pilot bit removably coupled to the arbor assembly, the pilot bit including a first end that is coupled to the arbor assembly and a second end extending past the step drill bit to define a cutting tip.

3. The drilling tool of claim 2, wherein the step drill bit includes a central bore, and wherein the pilot bit extends through the central bore.

4. The drilling tool of claim 1, wherein the step drill bit includes a body having a proximate end adjacent the arbor assembly, a distal end opposite the proximate end, and a plurality of axially spaced progressively sized steps between the proximate end and the distal end.

5. The drilling tool of claim 4, wherein the step drill bit includes six or more steps.

6. The drilling tool of claim 1, wherein the step drill bit is made of a first material and the arbor assembly is made from a second material that is different from the first material.

7. The drilling tool of claim 1, wherein the step drill bit includes a hex-shaped section, and wherein the first end of the shank includes a hex boss that is received in the hex-shaped section.

8. The drilling tool of claim 1, wherein the step drill bit includes a channel adjacent the first end of the shank, and wherein the step drill bit is secured to the arbor assembly when the ball bearing is disposed in the channel.

9. The drilling tool of claim 8, wherein the shank includes an annular recess, and wherein the step drill bit is removable from the arbor assembly when the ball bearing is disposed in the annular recess.

10. The drilling tool of claim 8, wherein the sleeve is biased towards the second end of the shank to secure the step drill bit to the arbor assembly.

11. The drilling tool of claim 1, wherein the ball bearing is rotationally moveable relative to the step drill bit.

12. A drilling tool assembly comprising:
an arbor assembly including a shank having a first end, a second end opposite the first end that is configured to be coupled to a power tool, and a longitudinal axis extending through the first and second ends;
a step drill bit removably coupled to the arbor assembly, the step drill bit including a body having a proximate end adjacent the arbor assembly, a distal end opposite the proximate end, a plurality of axially spaced progressively sized steps between the proximate end and the distal end, and a bore centrally located through the step drill bit; and
a pilot bit removably coupled to the arbor assembly and extending through the central bore of the step drill bit, the pilot bit including a first end that is coupled to the arbor assembly and a second end extending past the distal end of the step drill bit to define a cutting tip,
wherein the arbor assembly further includes a sleeve disposed around the shank and moveable along the shank in a direction parallel to the longitudinal axis, the sleeve biased towards the second end of the shank to secure the step drill bit to the arbor assembly.

13. The drilling tool assembly of claim 12, wherein the first end of the shank includes a hex-shaped boss with an opening, and wherein the step drill bit includes a hex-shaped section that receives the hex-shaped boss, and wherein the first end of the pilot bit is received in the opening of the hex-shaped boss.

14. The drilling tool assembly of claim 12, wherein the step drill bit includes a flute extending between the proximal end and the distal end.

15. The drilling tool assembly of claim 14, wherein the pilot bit is coated in a physical vapor deposition coating.

16. A drilling tool assembly comprising:
an arbor assembly including a shank having a first end, a second end opposite the first end that is configured to be coupled to a power tool, and a longitudinal axis extending through the first and second ends, the arbor assembly made of a first material;
a step drill bit coupled to the arbor assembly, the step drill bit including a body having a proximate end adjacent the arbor assembly, a distal end opposite the proximate end, and a plurality of axially spaced progressively sized steps between the proximate end and the distal end, the step drill bit made of a second material that is different than the first material; and
a pilot bit coupled to the arbor assembly and extending through the step drill bit, the pilot bit made of a third material that is different than both the first material and the second material.

17. The drilling tool assembly of claim 16, wherein the first material has a hardness that is less than the third material.

18. The drilling tool assembly of claim 16, wherein the first material is silicon vanadium chrome magnesium steel, the second material is a first high speed steel, and the third material is a second high speed steel that is different from the first high speed steel.

19. The drilling tool assembly of claim 18, wherein the first high speed steel is ASTM A600 M42 steel and the second high speed steel is ASTM A600 M35 or M2.

20. The drilling tool assembly of claim 16, wherein the first material has a Rockwell hardness, measured on the C scale, that is in a range between 52-56 HRC, the second material has a Rockwell hardness, measured on the C scale, that is in a range between 63-67 HRC, and the third material has a Rockwell hardness, measured on the C scale, that is in a range between 63-68 HRC.

* * * * *